United States Patent [19]

Nakada et al.

[11] 4,344,344
[45] Aug. 17, 1982

[54] ELECTRONIC MUSICAL INSTRUMENT HAVING MUSICAL PERFORMANCE TRAINING SYSTEM

[75] Inventors: Akira Nakada; Toshio Sugiura, both of Hamamatsu; Eisaku Okamoto, Hamakita; Kiyoshi Yoshida, Hamamatsu, all of Japan

[73] Assignee: Nippon Gakki Seizo Kabushiki Kaisha, Hamamatsu, Japan

[21] Appl. No.: 179,261

[22] Filed: Aug. 18, 1980

[30] Foreign Application Priority Data

Aug. 31, 1979 [JP] Japan ............................... 54-111435

[51] Int. Cl.³ .............................................. G10F 1/00
[52] U.S. Cl. ..................................... 84/1.03; 84/478; 84/DIG. 12
[58] Field of Search ....................... 84/478, 1.03, 1.01, 84/1.28, DIG. 12

[56] References Cited

U.S. PATENT DOCUMENTS

| | | | |
|---|---|---|---|
| 3,353,435 | 11/1967 | Schmoyer | 84/478 |
| 3,683,096 | 8/1972 | Peterson et al. | 84/1.03 |
| 3,829,597 | 8/1974 | Peterson et al. | 84/DIG. 12 |
| 3,881,390 | 5/1975 | Gullickson | 84/478 |
| 4,037,511 | 7/1977 | Del Castillo | 84/478 |
| 4,281,579 | 8/1981 | Bennett, Sr. | 84/478 |

Primary Examiner—J. V. Truhe
Assistant Examiner—Forester W. Isen
Attorney, Agent, or Firm—Frishauf, Holtz, Goodman and Woodward

[57] ABSTRACT

An electronic musical instrument comprises a keyboard, a tone signal forming circuit to produce musical tone signals corresponding to keys being depressed on the keyboard, a memory to store musical performance data, a keyboard display device to visually instruct a pupil or trainee as to which keys are to be depressed on the keyboard in accordance with the performance data read out of the memory so that the pupil or trainee may effect a musical performance on the keyboard while following key indications, and an automatic musical performance device to effect an automatic musical performance of different type from the musical performance effected on the keyboard. The pupil or trainee may selectively effect the musical performance on the keyboard with or as the accompaniment by or for the automatic musical performance. Preferably the pupil or trainee effects a melody or chord performance on the keyboard with the accompaniment of an automatic chord performance and/or an automatic rhythm performance, or an automatic melody performance and/or an automatic rhythm performance.

12 Claims, 8 Drawing Figures

ELECTRONIC MUSICAL INSTRUMENT HAVING MUSICAL PERFORMANCE TRAINING SYSTEM

BACKGROUND OF THE INVENTION

This invention relates to an electronic musical instrument, and, more particularly, to an electronic musical instrument on which a pupil or trainee may effectively practice.

In order for a pupil or trainee to readily practice a keyboard instrument, a key indication system is proposed which visually instructs the pupil or trainee as to which keys are to be actuated on a keyboard. For example, according to the system disclosed in U.S. Pat. No. 3,353,435, a two-track magnetic tape is used, one-track being recorded with a teacher's vocal instruction or sound of the organ, and the other track being recorded with key designating signals to designate keys to be actuated on the keyboard. When the trainee plays the instrument, indication lamps for the respective keys are selectively lit in accordance with the key designation signals reproduced from the magnetic tape, so that the trainee may operate the keys as indicated to play a designated music piece. Due to the audible instruction or sounds reproduced from the magnetic tape, the trainee can also be informed through his sense of hearing as to which keys are to be actuated or listen to the sounds corresponding to keys to be actuated.

In U.S. Pat. No. 4,035,511, a key designating device is disclosed which is comprised of an apertured record sheet and an optical readout device.

With such a self-training system for keyboard instruments, it is difficult for the trainee to play the instrument with musical sensation because he is merely required to operate the keys as indicated. To make an effective performance of the keyboard instrument with musical sensation it is desired that the trainee can play a part (such as melody or chord) of a music piece on the keyboard to the accompaniment of an automatic performance of the other part (such as chord or melody) of the music piece. With a two-keyboard electronic organ, in particular, it is desired that the trainee may selectively play a melody on the upper keyboard mainly or chords on the lower keyboard mainly to the accompaniment of an automatic chord performance or an automatic melody performance. In this case, it is more effective if the trainee can play the instrument to the accompaniment of an automatic rhythm performance.

SUMMARY OF THE INVENTION

An object of this invention is to provide an electronic musical instrument in which a pupil or trainee can effect a musical performance on its keyboard, while following key indications, with richer musical sensation.

Another object of this invention is to provide an electronic musical instrument in which a pupil or trainee can effect a musical performance on its keyboard, while following key indications, in musical association with an automatic musical performance of different type from the musical performance effected on the keyboard.

Still another object of this invention is to provide an electronic musical instrument which is provided with an upper keyboard section capable of either a manual performance or an automatic performance of a melody and a lower keyboard section capable of either a manual performance or an automatic performance of chords and in which a pupil or trainee can play a melody on the upper keyboard, while following key indications, to the accompaniment of an automatic chord performance or play chords on the lower keyboard, while following key indications, to the accompaniment of an automatic melody performance.

Briefly, in accordance with this invention there is provided an electronic musical instrument comprising memory means for storing musical performance data, a keyboard having keys, keyboard display means responsive to the performance data read out of the memory to visually indicate keys to be depressed on the keyboard, tone signal forming means coupled to the keyboard for forming a musical tone signal corresponding to a key depressed on the keyboard so that a musical performance is effected on the keyboard by depressing keys in accordance with the performance data and, automatic musical performance means for effecting in accordance with the performance data an automatic musical performance of different type from the musical performance effected on the keyboard. The automatic musical performance is an automatic melody performance, automatic chord performance or automatic rhythm performance, while the musical performance effected on the keyboard is a melody performance or chord performance.

DETAILED DESCRIPTION OF THE PREFERRED EMBODIMENT

This invention will be described, by way of example, in connection with an electronic organ including an upper keyboard, a lower keyboard and an automatic rhythm performance device.

Figure 1:
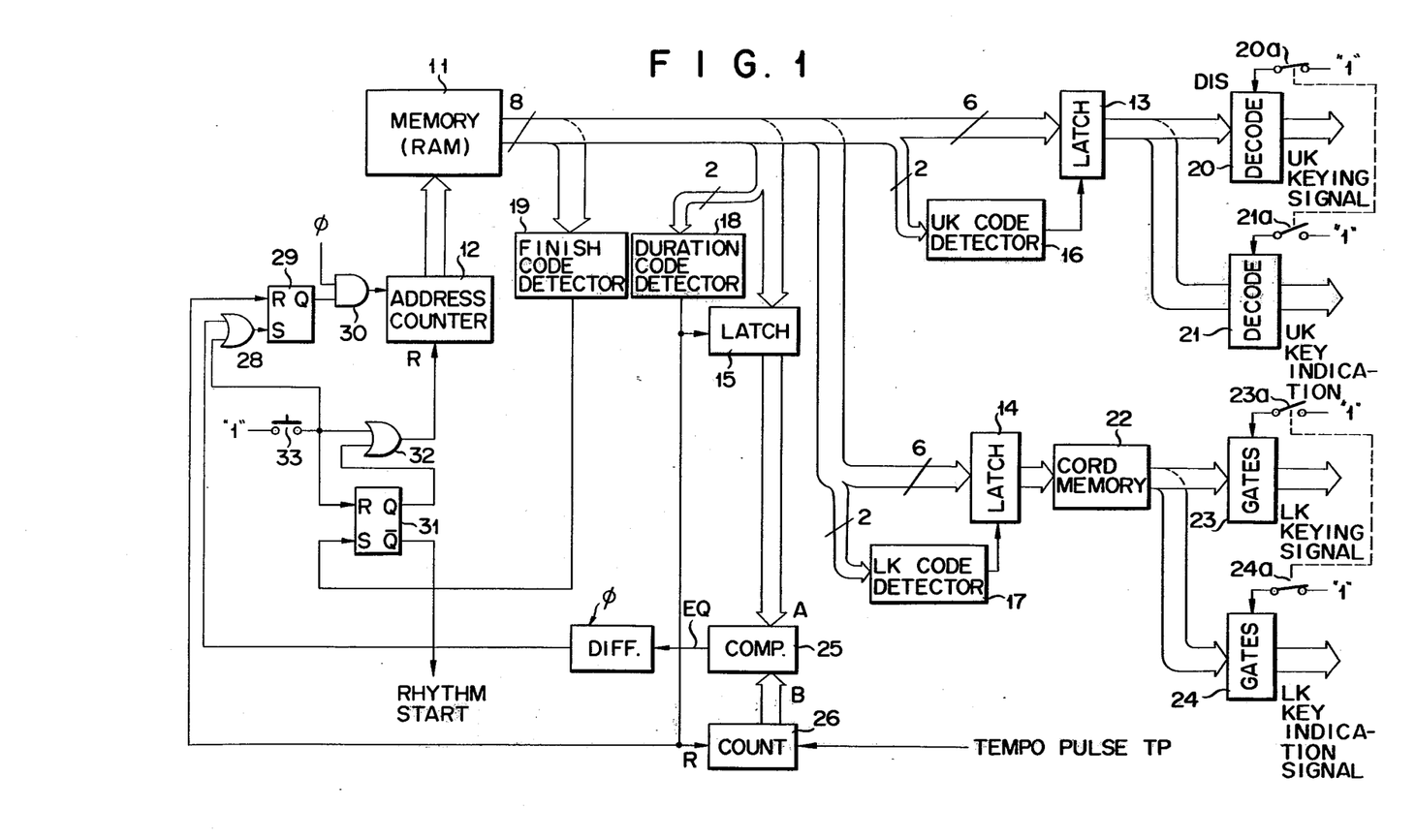
FIG. 1 shows, in block form, a part of an electronic musical instrument embodying this invention.

In FIG. 1, reference numeral 11 designates a memory formed of, for example, a random access memory (RAM) which stores performance data of a music to be played on the organ. The performance data are divided into melody data and accompaniment or chord data. The melody data include melody note pitch data and melody note duration data. The respective data have a word length of eight bits and are stored in memory locations with addresses having increments of one. The addresses of memory locations are designated by an address counter 12 so that the respective data are sequentially read out of the memory 11. As described later, the data readout from the memory 11 is suspended each time the readout of one set of data corresponding to a single melody note and including note pitch data and note duration data, or note pitch data, chord data and note duration data is completed. The data readout is resumed after the lapse of a time represented by the note duration data which is lastly read out in each set of data.

Figure 4:
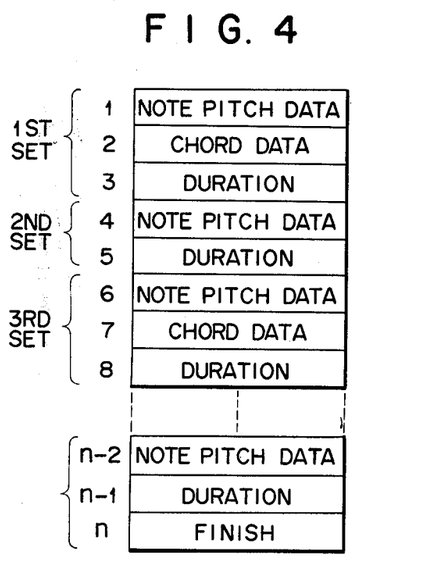
FIG. 4 shows a memory map of the memory 11 of FIG. 1.

FIG. 4 shows, by way of example, a memory map representing an arrangement of the performance data stored in the respective memory locations. In the memory locations having addresses 1 through 3 there are respectively stored the first melody note pitch data, the first chord data and the first melody note duration data. In the memory locations having addresses 4 and 5 there are respectively stored the second melody note pitch data and the second melody note duration data. The data stored in the memory locations having addresses 1 through 3 constitute the first set of data, and the data stored in the memory locations having addresses 4 and 5 constitute the second set of data. Each note duration data is used to define the boundary between the sets of data. The absence of chord data in the second set of data means that the chord represented by the chord data in the first set of data should be continuously played with the second melody note. In the last memory location there is stored in FINISH code representing the end of music performance.

Figure 5:
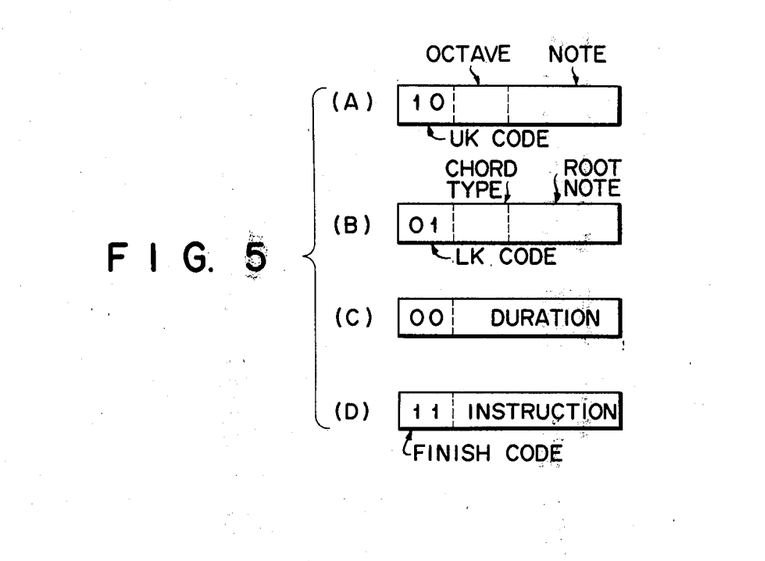
FIG. 5 shows data formats of the respective data stored in the memory.

Data formats used in this embodiment are shown in FIG. 5. Each data includes a two-bit identifying code. FIG. 5(A) shows the melody note pitch data consisting of a UK identifying code of, for example "10" designating the upper keyboard mainly for melody performance, and six-bit note pitch data (key designating data). Further, the note pitch data consists of four-bit note name data and two-bit octave data representing the octave to which the note belongs. The chord data consists, as shown in FIG. 5(B), of an LK code of "01" designating the lower keyboard mainly for chord performance and six-bit data representing the kind of chord to be played. The chord data consists of two-bit data representing one of chord types such as major minor, major seventh and minor seventh chords and four-bit data representing the root note of a chord. The root note and chord type define the kind of chord to be played. The note duration data consists, as shown in FIG. 5(C), of the duration identifying code "00" and six-bit duration data. FIG. 5(D) shows instruction data having a FINISH instruction code of "11".

Turning back to FIG. 1, the six-bit data read out of the memory 11 is commonly applied to a latch circuit 13 for storing melody note data, a latch circuit 14 for storing the chord data and a latch circuit 15 for storing the note duration data. The two-bit identifying codes are commonly applied to a UK code detector 16, an LK code detector 17, a duration code detector 18 and a FINISH code detector 19. The latch circuit 13 latches the note pitch data when the detector 16 detects the UK code of "10", and the latch circuit 14 latches the chord data when the detector 17 detects the LK code of "01". When the detector 18 detects the duration code of "00" the latch circuit 15 latches the note duration data. After the readout of all the performance data the FINISH code is read out of the memory 11 and then detected by the detector 19.

The six-bit output data of the latch circuit 13 is commonly applied to the decoders 20 and 21 each having the same number of outputs as the keys (typically 48) of the upper keyboard. Each of decoders 20 and 21 decodes the note pitch data applied thereto to cause a corresponding one of the outputs to go high. This high level output signal of the decoder 20 is applied, as a UK keying signal, to a UK musical tone forming circuit as described later to automatically form a musical tone signal having a pitch represented by the note pitch data read out of the memory. The high level output signal of the decoder 21 is applied, as a key indication signal, to a UK display device associated with the upper keyboard and having visual indicators such as lamps and LED's provided for the respective keys of the upper keyboard to visually indicate as to which key is to be depressed according to the note pitch data stored in the memory. When a key indicated is depressed on the upper keyboard, a UK keying signal corresponding to the key being depressed is applied to the UK tone forming circuit so that a musical tone signal is produced which corresponds to the note of key depressed.

The output chord data of the latch circuit 14 is applied, as an address signal, to a code memory (ROM) 22 such as a matrix circuit having the same number of outputs as twelve notes of an octave. The code memory 22 is responsive to the chord data to cause three outputs thereof corresponding to the root, third and fifth notes of the chord designated to go high. For example, when C major is designated, the outputs corresponding to the notes C (root note), E (third note) and G (fifth note) go high.

The outputs of the chord memory 22 are commonly coupled to an LK musical tone forming circuit and an LK key display circuit described later through gate circuits 23 and 24, respectively.

Mode changing switches 20a and 21a are coupled to the decoders 20 and 21 respectively. Likewise, mode changing switches 23a and 24a are coupled to the gate circuits 23 and 24, respectively. The switches 20a and 23a are provided, when closed, to respectively disable the decoder 20 and gate circuit 23 from coupling UK and LK keying signals to the UK and LK musical tone forming circuits, respectively. Likewise, the switches 21a and 24a are adapted, when closed, to disable the decoder 21a and gate circuit 24a from coupling UK and LK key indication signals to the UK and LK key display circuits. The switches 20a and 21a are preferably constructed to be ganged with each other such that when the switch 20a is ON the switch 21a is OFF and vice versa. This also applies to the switches 23a and 24a.

The note duration data latched by the latch circuit 15 is coupled to a comparator 25 as a comparison signal A. To the comparator 25 is coupled, as the other comparison signal B, a count output signal of a note duration counter 26 which counts a tempo pulse TP produced by a tempo oscillator of the automatic rhythm performance device and having a period shorter than the duration of a thirty-second note, for example, ⅛ second. The counter 26 is reset when the detector 18 detects the note duration identifying code of "00".

The comparator 25 produces an equal signal EQ when a coincidence occurs between the comparison signals A and B. The signal EQ is differentiated by a differentiator 27 driven by a system clock $\phi$ (e.g. 1 MHz). A differentiated output signal of the differentiator 27 is applied through an OR circuit 28 to the set input of a readout-control flip-flop circuit 29 to cause the set output Q thereof to go high. As a result, an AND gate 30 is enabled to apply the system clock $\phi$ to the address counter 12 as an address advancing signal.

The flip-flop circuit 29 has its reset input coupled to the output of the note duration code detector 18 so that the flip-flop circuit 29 is reset to disable the AND gate 30 each time the note duration data read out of the memory 11 is detected by the detector 18. Namely, the address counter 12 has its count advanced in increments of one during the readout of one set data as described above. The one set data is read out of the memory 11 within a very short time due to the high frequency system clock φ. As will be evident from the foregoing, after the last data representing a melody note duration in each set of data is read out, the data readout of the memory 11 is suspended. The data readout is resumed when a time corresponding to the note duration elapses, in other words, when the equal signal EQ is produced by the comparator 25.

The output of FINISH code detector 19 is coupled to the set input of flip-flop circuit 31 whose output Q is coupled to the reset input of address counter 12 through an OR gate 32. Therefore, upon detection of the FINISH code at the end of music performance the flip-flop circuit 31 is set so that the address counter 12 is reset.

A start switch 33 connected to a logical 1 level voltage source is coupled to the OR gates 28 and 32 and the reset input of flip-flop circuit 31 whose output Q is coupled to an automatic rhythm performance device described later. Accordingly, when the start switch 33 is rendered ON the address counter 12 and the flip-flop circuit 31 are reset and the flip-flop circuit 29 is set with the result that the address counter 12 is enabled to count the system clock φ from the initial value and a rhythm start signal is applied to the automatic rhythm performance device. Namely, when the start switch 33 is rendered ON, the data readout from the memory 11 and the automatic rhythm performance start.

Figure 2:
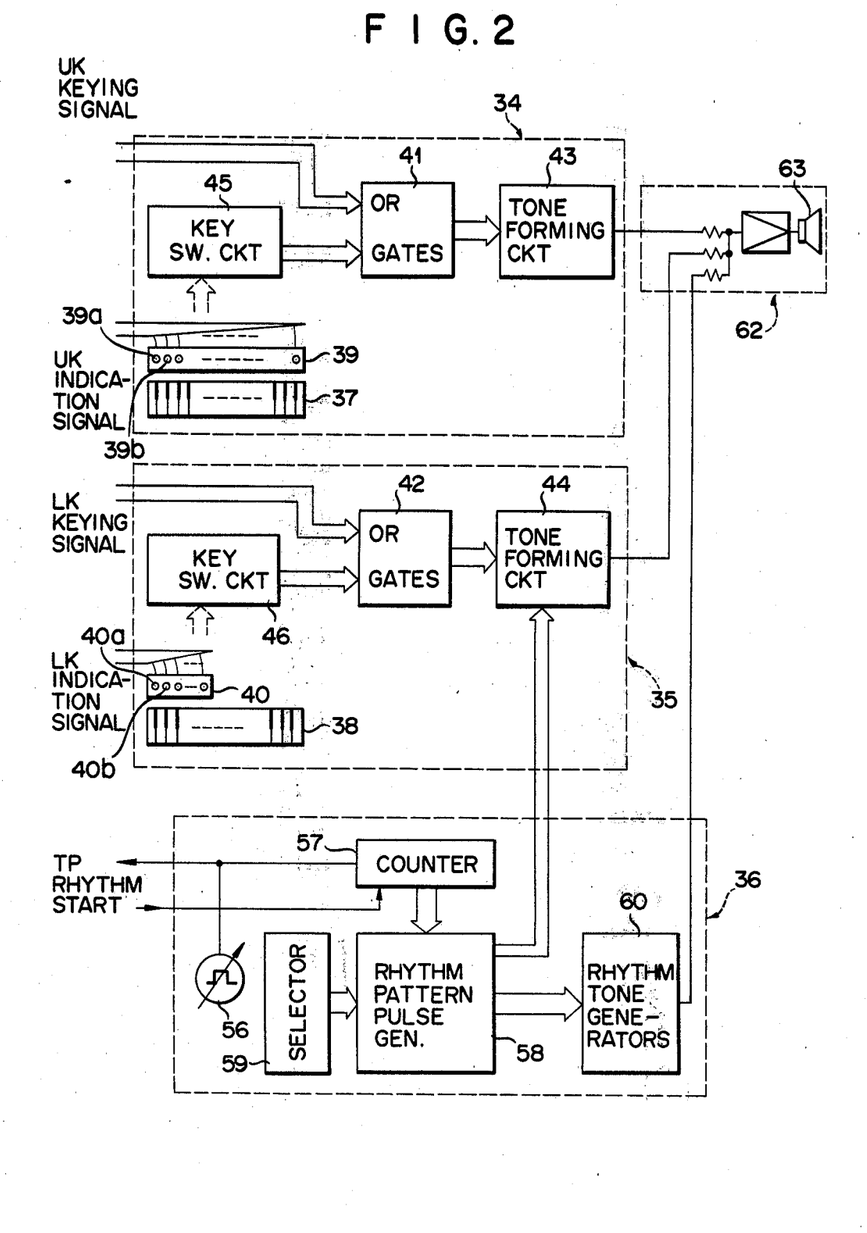
FIG. 2 shows, in block form, the other part of the electronic musical instrument.

FIG. 2 shows an arrangement of musical tone forming sections including a melody (UK) tone forming section 34, a chord (LK) tone forming section 35 and an automatic rhythm performance device 36. The tone forming sections 34 and 35 are provided with upper and lower keyboards 37 and 38, respectively, and UK and LK key display circuits 39 and 40 associated with the upper and lower keyboards 37 and 38, respectively. The UK key display circuit 39 is provided with 48 visual indicators 39a, 39b, . . . such as lamps which may be disposed on the respective keys of the upper keyboard 37 and are selectively lit by the UK key indication signals from the decoder 21 so as to visually instruct the trainee as to which keys are to be actuated on the upper keyboard.

On the other hand, the LK key display circuit 40 associated with the lower keyboard 38 includes twelve visual indicators 40a, 40b, . . . which may be disposed on the twelve keys of the lowest octave of the lower keyboard 38. The visual indicators for the lower keyboard 38 are selectively lit by the key indication signals from the gate circuit 24 so that keys to be actuated for a chord performance on the lower keyboard 38 are visually indicated to the trainee.

The UK keying signal from the decoder 20 is applied to a UK tone forming circuit 43 through an OR circuit 41 consisting of a plurality of OR gates. A key switch circuit 45 is coupled to the upper keyboard 37 and produces a keying signal which is applied to the tone forming circuit 43 through the OR circuit 41 when a key is operated on the upper keyboard 37. The UK tone forming circuit 43 forms, in accordance with keying signals applied thereto from the decoder 20 or the key switch circuit 45, corresponding tone signals which are in turn applied to a sound system 62 incorporating a loudspeaker 63 so that melody tones are sounded.

The LK keying signals from the gate circuit 23 are coupled to a chord/bass tone forming circuit 44 for forming chord and bass tone signals through an OR circuit 42 having plural OR gates. LK keying signals produced by a key switch circuit 46 coupled to the lower keyboard 38 when keys are actuated thereon are also coupled to the tone forming circuit 44 through the OR circuit 42. The chord/base tone forming circuit 44 forms, in accordance with keying signals applied thereto from the gate circuit 23 or the key switch circuit 46, chord/bass tone signals which are in turn applied to the sound system 62 to sound the chord/bass tones. The tone forming circuits 43 and 44 are each arranged such that a plurality of tone generators are provided, and a tone generator or generators are selectively coupled to the sound system 62 by a keying signal or signals.

Figure 3:
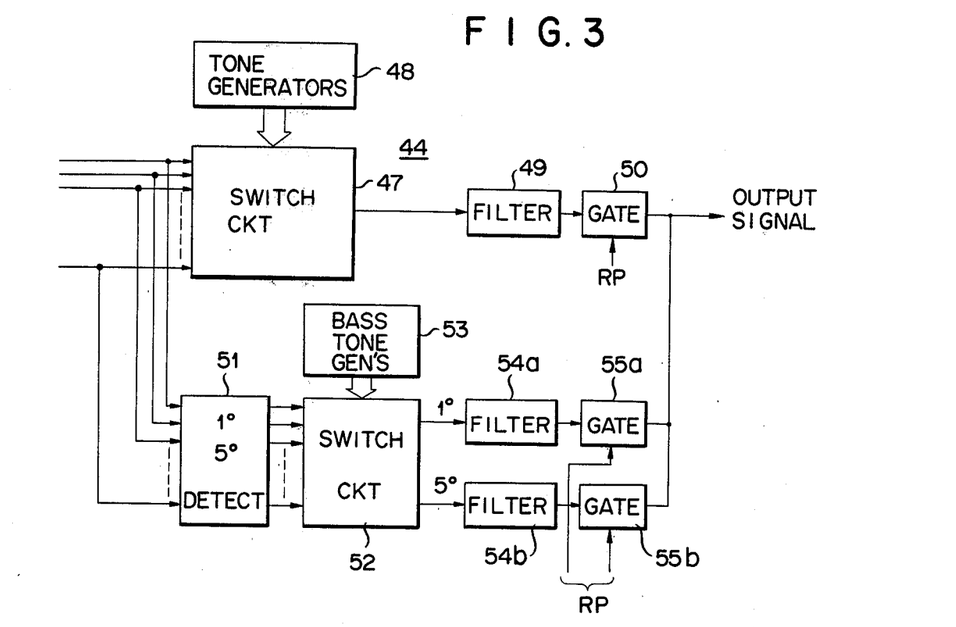
FIG. 3 is a block diagram of the tone forming circuit 44 of FIG. 2.

FIG. 3 shows an arrangement of the chord/bass tone forming circuit 44. The twelve outputs of the OR circuit 42 are coupled to a switch circuit 47 to which twelve tone generators 48 are coupled and which is followed by a tone coloring filter 49 and a gate 50. When the gate circuit 23 is enabled, or when three keys are simultaneously depressed on the lower keyboard 38, three outputs of the OR circuit 42 go high. This causes the switch circuit 47 to couple three tone generators corresponding to a chord designated to the tone coloring filter 49. For example, when the chord "C major" is designated by the chord data read out of the memory 11 tone generators corresponding to the notes C, E and G are coupled to the tone coloring filter 49.

The outputs of the OR circuit 42 are also coupled to a detector 51 which detects the root note and fifth note of a chord being played. The outputs of detector 51 are coupled to a switch circuit 52 to which are coupled bass tone generators 53 having a compass of pedal keyboard. For example, when the chord "C major" is being played, the outputs of detector 51 corresponding to the note C (root note) and the note G (fifth note) are caused to go high so that bass tone signals corresponding to the notes C and G are coupled to the tone coloring filters 54a and 54b, respectively, which are in turn delivered to the sound system 62 through gates 55a and 55b, respectively.

The gates 50, 55a and 55b are enabled and disabled by rhythm pulse signals RP from the automatic rhythm performing device 36 to provide rhythmic chord and bass performances. The gates 55a and 55b are alternately enabled and disabled by the rhythm pulse signals.

The automatic rhythm performance device 36 is provided, as shown in FIG. 2, with a tempo oscillator 56 of frequency-variable type. The tempo clock TP of the oscillator 56 is applied to the above-mentioned duration counter 26 and a counter 57 having a plurality of binary stages which is enabled to count the tempo clock TP by the rhythm start signal produced by the flip-flop circuit 31 when the start switch 33 is rendered ON. The binary outputs of the counter 57 are coupled to a rhythm pattern pulse generator 58 which produces a plurality of rhythm pattern signals and the rhythm pulses to drive the gates 50, 55a and 55b. Outputs of the rhythm pattern pulse generator 58 are coupled to respective rhythm tone generators 60. The circuits 58 and 60 are well known and their detailed descriptions are omitted. A rhythm selector 59 is provided for selecting one or more desired rhythm tone generators and selecting rhythm pattern signals to drive the selected rhythm tone generators. The rhythm tone signals thus produced are mixed together and then delivered to the sound system through a rhythm tone control switch 61 to sound rhythm tones.

The operation of the electronic organ will be described hereinafter. To operate the organ, the start switch 33 is first rendered ON so that the address counter 12 is enabled to count the system clock $\phi$ and the rhythm performance device is supplied with the rhythm start signal from the flip-flop circuit 31. The addresses of memory 11 are, therefore, designated by the address counter 12 so that the note pitch data, the chord data and the note duration data of the first set of data are sequentially read out of the memory 11 at a high speed due to the high frequency system clock $\phi$, and latched by the latch circuits 13, 14 and 15, respectively. Upon detection of the duration code of "00" by the detector 18, the flip-flop circuit 29 and the duration counter 26 are reset with the result that the address counter 12 stops counting the system clock $\phi$ and the duration counter 26 starts counting the tempo pulse TP from the initial value. Accordingly, the data readout from the memory 11 is suspended until the comparator 25 produces the equal signal EQ to set the flip-flop circuit 29, in other words, until a time corresponding to the note duration data of the first data set latched by the latch circuit 15 elapses.

The decoder 20 decodes the note pitch data latched by the latch circuit 20 and couples a UK keying signal corresponding to the note data to the UK tone forming circuit 43 when the switch 20a is open so that a musical tone signal having the pitch represented by the note pitch data is automatically produced by the UK tone forming circuit 43. The UK tone forming circuit 43 continues forming the musical tone signal until the next melody note data is read out of the memory 11, in other words, until the comparator 25 produces the equal signal EQ. Namely, when the switch 20a is open melody tones are automatically produced in accordance with the melody performance data stored in the memory to effect an automatic melody performance. The automatic melody performance is inhibited by closing the switch 20a.

When the switch 21a is open, on the other hand, the decoder 21 also decodes the note pitch data latched by the latch circuit 13 and couples a UK key indication signal to the UK key display circuit 39 to visually indicate a key represented by the note pitch data. When the trainee depresses the key indicated a UK keying signal is applied to the UK tone forming circuit 43 from the key switch circuit 45 so that the UK tone forming circuit 43 produces the musical tone signal represented by the note pitch data. The key display circuit 39 continues the key indication until the readout of the next set data starts. Namely, when the switch 21a is open a manual performance of melody stored in the memory can be made on the upper keyboard in accordance with key indications. The key indications are inhibited by closing the switch 21a.

When the switch 23a is open the gate circuit 23 couples three LK keying signals represented by the chord data latched by the latch circuit 14 to the LK tone forming circuit 44 to produce chord tone signals and bass tone signals corresponding to the notes designated by the chord data. On the other hand, when the switch 24a is open, the gate circuit 24 couples three LK key indication signals to visually indicate three keys on the lower keyboard represented by the chord data latched by the latch circuit 14. When the keys indicated are depressed three LK keying signals are coupled to the LK tone forming circuit 44 from the key switch circuit 46 to produce three chord tone signals and two bass tone signals. Namely, when the switch 23a is open chord/bass tones are automatically produced in accordance with the chord data stored in the memory to effect an automatic chord performance. The automatic chord performance is inhibited by closing the switch 23a. On the other hand, when the switch 24a is open chord/bass manual performance can be made on the lower keyboard in accordance with key indications. The key indications of the lower keyboard are inhibited by closing the switch 24a.

The electronic organ constructed as described above enables the trainee to play the organ in various modes. For example, when the mode switches 20a and 24a are set On and the mode switches 21a and 23a are set OFF the trainee can play chords, in accordance with key indications, on the lower keyboard to the accompaniment of an automatic melody performance. On the other hand, when the mode switches 20a and 24a are set OFF and the mode switches 21a and 23a are set ON the trainee can effect a melody performance on the upper keyboard to the accompaniment of an automatic chord performance. In either case, if the rhythm tone control switch 61 is set ON, the melody performance or chord performance can be more effectively made to the accompaniment of an automatic rhythm performance.

Instead of or in addition to the above-mentioned automatic performance devices, other automatic performance devices such as an automatic arpeggio and an automatic subsidiary melody may be incorporated in the electronic musical instrument in order to facilitate trainee's practice.

Figure 6:
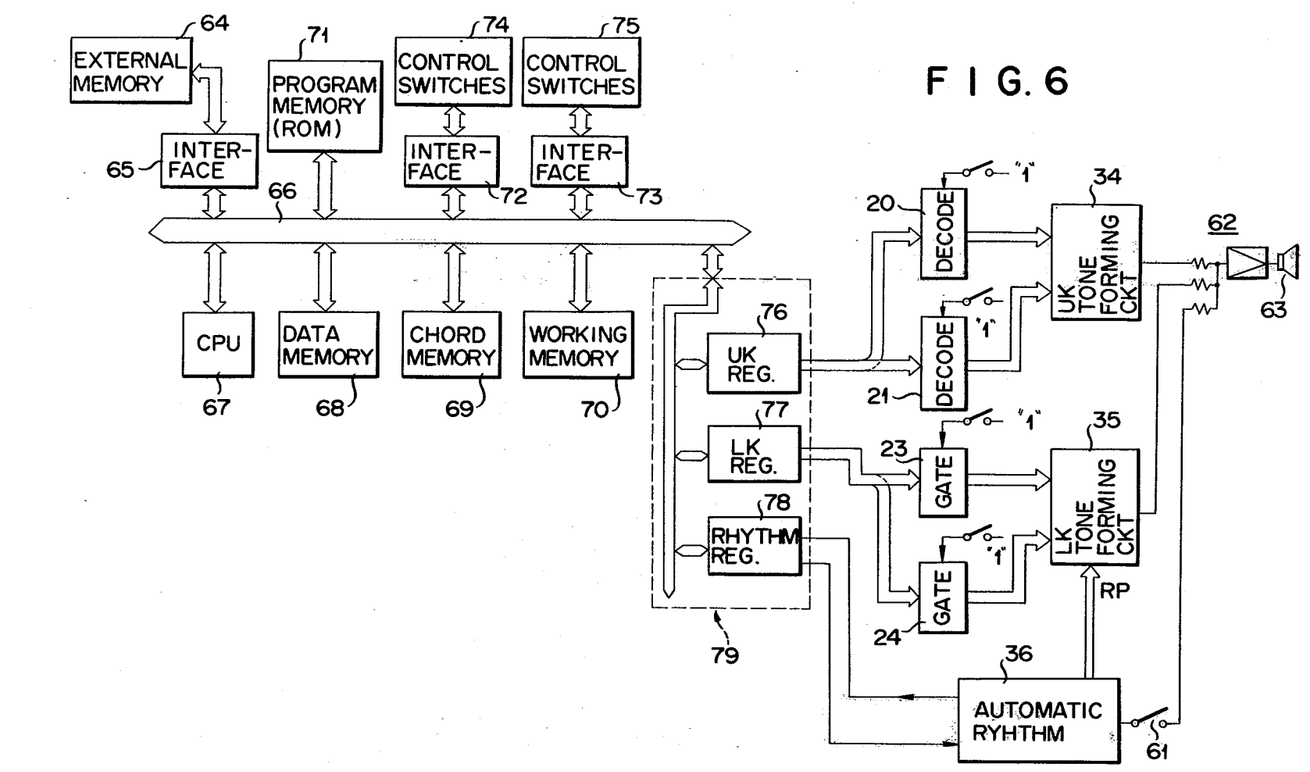
FIG. 6 is a schematic block diagram of a computerized electronic musical instrument.

The above-mentioned apparatus may be realized by a computer circuit. As shown in FIG. 6, the performance data from an external memory 64 such as a magnetic tape are coupled through an interface 65 to a common bus 66 to which a central processing unit (CPU) 67, a data memory 68, a chord data memory 69, a working memory 70 and a program memory 71 are coupled. To the common bus 66 control switch groups 74 and 75 are also coupled through interfaces 72 and 73, respectively. Further, to the common bus 66 is coupled an interface 79 including a UK data register 76, an LK data register 77, and a rhythm control register 78. The output of the UK data register 76 is commonly coupled to the decoders 20 and 21 and the output of the LK data register is commonly coupled to the gate circuits 23 and 24 so as to control the UK and LK musical tone forming sections 34 and 35 as in the above-mentioned embodiment. The rhythm control register 78 is coupled to the automatic rhythm performing device 36.

The control switch group 74 is adapted to control the transmission of the performance data stored in the external memory 64 to the data memory 68, while the control switch group 75 is adapted to effect the start-/stop control of the musical instrument, reading out of the performance data of the data memory 68 and transmission of them to the interface 79.

Figure 7:
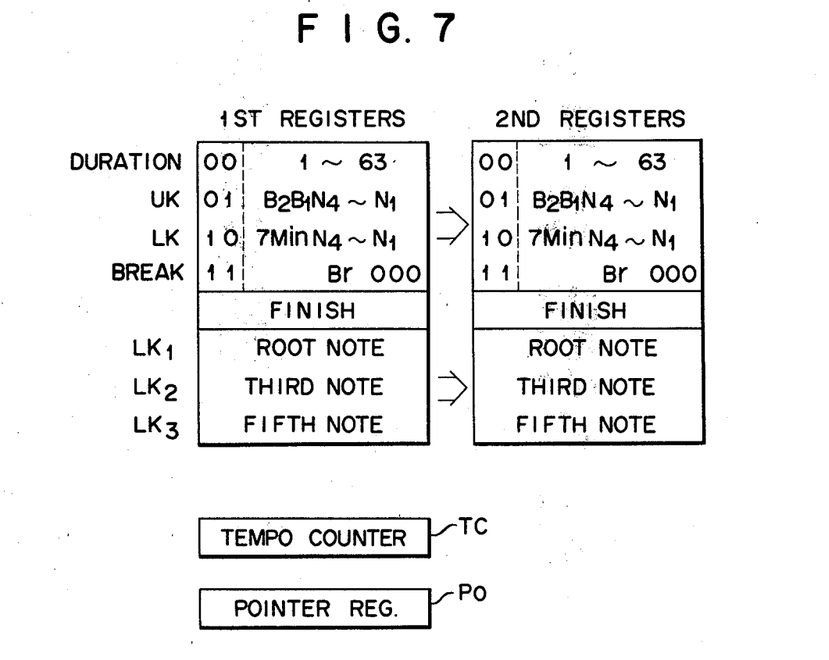
FIG. 7 shows memory contents of the working memory of FIG. 6.

FIG. 7 shows the working memory 70 which is provided with first and second register groups adapted to store in the respective registers of each group the note duration data, melody note pitch data, chord data, break instruction data (adapted to prevent adjacent two notes of the same pitch from sounding continuously), chord root note data, chord third note data, chord fifth note data and the FINISH code representing the end of music performance. By execution of programs, the data in the second registers are transferred to the registers of the interface 79, the data in the first registers to the second registers, and the data read out of the data memory 68 to the first registers. Further, a pointer register $P_0$ and a tempo counter TC are provided. The pointer register $P_0$ is adapted to designate addresses of the data memory 68 so that the data is transferred from the data memory 68 to the first registers of the working memory 70.

Figure 8:
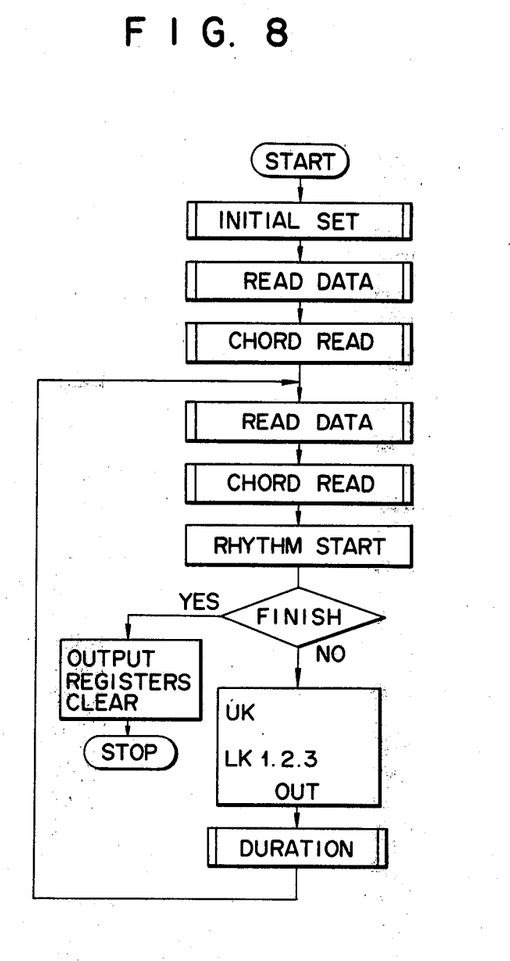
FIG. 8 is a flow chart explaining operations of the instrument of FIG. 6.

FIG. 8 is a flow chart representing operations of the above-mentioned apparatus. When a start instruction is first given, the apparatus is initially set so that the first and second registers of the working memory 70 are cleared, and the pointer register $P_O$ is set to the start address of the data memory 68. As a result, a subroutine "READ DATA" is executed so as to load one set of data read out of the data memory 68 into the first registers of the working memory 70. Next, a subroutine "CHORD READ" is executed so that the root note data $LK_1$, third note data $LK_2$ and fifth note data $LK_3$ are read out of the chord data memory 69 by the LK data stored in the first register and are loaded into the first registers.

Next, a subroutine "READ DATA" is executed by CPU 67 so that the data is transferred from the first registers to the second registers. Each time the data transfer from the first registers to the second registers is completed the pointer register $P_O$ is incremented by one by CPU 67 so that the next set of data from the data memory 68 is loaded into the first registers of working memory 70. And the subroutine "CHORD READ" is again executed, and at this time, a start instruction is given to the rhythm control register 78 to operate the automatic rhythm performing device 36. At this stage, a judgement is made as to whether the FINISH code is present or not in the second registers of working memory 70. If the judgement is "NO" the data in the second registers is loaded into the registers 76 to 78 in the interface 79 to produce musical tones. The tempo counter TC is set to a count corresponding to the note duration data and counted down by the tempo pulse TP from the automatic rhythm performing device 36. When the tempo counter TC is counted down to 0, the operation advances to the next step so that the above-mentioned operations are repeated. On the other hand, if the judgement is "YES" the registers are cleared to stop the musical performance.

What we claim is:

1. An electronic musical instrument comprising:
memory means having memory addresses for storing in the respective addresses performance data constituting the progression of a music piece to be played;
readout control means coupled to said memory means for reading out, by designating a plurality of respective address locations of said memory means, said performance data at a selectable tempo;
keyboard means having keys and means responsive to depression of a key to produce a keying signal corresponding to the depressed key;
key indicating means coupled to said memory means and being responsive to a part of said performance data read out of said memory means to indicate a key to be depressed on said keyboard means;
tone signal producing means coupled to said keyboard means and responsive to said keying signal to produce a musical tone signal corresponding to said depressed key of said keyboard means so that a musical performance is effected on said keyboard means by depressing keys indicated by said key indicating means;
automatic tone signal forming means coupled to said memory means and being responsive to a part of said performance data read out of said memory means for effecting an automatic musical performance of a different type from said musical performance effected on said keyboard means by depression of keys indicated by said key indicating means; and
means coupled to said key indicating means and to said automatic tone signal forming means for operating said key indicating means and said automatic tone signal forming means in timed relation to each other.

2. An electronic musical instrument comprising:
memory means having memory addresses for storing in the respective addresses performance data constituting the progression of a music piece to be played, said performance data including first performance data representing one musical part of the music piece and second performance data representing another musical part of the music piece, the performance data being sequentially read out of said memory means;
readout control means coupled to said memory means for reading out, by designating a plurality of respective address locations of said memory means, said first and second performance data at a selectable tempo;
automatic music performing means responsive to said first performance data read out of said memory means to automatically produce musical tone signals corresponding to said first performance data;
keyboard means having keys and means responsive to depression of a key to produce a keying signal corresponding to the depressed key;
key indicating means coupled to said memory means being responsive to said second performance data read out of said memory means to indicate a key to be depressed on said keyboard means; and
tone signal producing means coupled to said keyboard means and responsive to said keying signal to produce a musical tone signal corresponding to said depressed key of said keyboard means.

3. The electronic musical instrument according to claim 2 further comprising coupling means coupled between said memory means and said tone signal producing means for producing and coupling a keying signal corresponding to said second performance data read out of said memory means, to thereby cause said tone signal producing means to automatically produce a tone signal corresponding to said second performance data; and means for selectively disabling said coupling means from coupling said keying signal to said tone signal producing means.

4. The electronic musical instrument according to claim 2 further comprising keyboard means coupled to said automatic performing means.

5. An electronic musical instrument comprising:
keyboard means having keys and means responsive to depression of a key to generate a keying signal corresponding to the depressed key;
tone signal producing means coupled to said keyboard means and being responsive to generation of said keying signal to produce a tone signal corresponding to the depressed key;

key indicating means for indicating a key to be depressed on said keyboard means;
a source of clock pulses for controlling a tempo of an automatic rhythm performance in accordance with the frequency of clock pulses;
automatic rhythm performing means coupled to said source of clock pulses and responsive to said clock pulses to produce rhythm tone signals;
memory means having memory addresses for storing in the respective addresses performance data of a music piece to be played in the form of pitch and duration data for each note;
means coupled between said memory means and said key indicating means and responsive to pitch data read out of said memory means to cause said key indicating means to indicate a key to be depressed on said keyboard means; and
data readout control means coupled to said memory means and to said source of clock pulses for reading respective data out of said memory means at a tempo according to the frequency of said clock pulse and suspending data readout from said memory means, after readout of said duration data for each note, during a time interval represented by said duration data.

6. The electronic musical instrument according to claim 5 further comprising coupling means coupled between said memory means and said tone signal producing means for producing and coupling a keying signal corresponding to the pitch data for each note to said tone signal producing means; and means for selectively disabling said coupling means from coupling said keying signal to said tone signal producing means.

7. An electronic musical instrument comprising:
first keyboard means having keys and means responsive to depression of a key to produce a keying signal corresponding to the depressed key;
first tone signal producing means coupled to said first keyboard means and responsive to application of said keying signal to produce a tone signal corresponding to the depressed key;
first key indicating means responsive to application of a key indicating signal to indicate a key to be depressed on said first keyboard means;
second keyboard means having keys and means responsive to depression of a key to produce a keying signal corresponding to the depressed key on the second keyboard means;
second tone signal producing means coupled to said second keyboard means and responsive to application of the keying signal corresponding to the depressed key on the second keyboard to produce a tone signal corresponding thereto;
second key indicating means responsive to application of a key indicating signal to indicate a key to be depressed on said second keyboard means;
memory means having memory addresses for storing in the respective addresses performance data of a music piece to be played, said performance data including first performance data representing one part of the music piece and second performance data representing another part of the music piece;
readout control means for reading out, by designating a plurality of respective address locations of said memory means, said performance data at a selectable tempo;
first coupling means coupled between said memory means and said first tone signal producing means and responsive to said first performance data read out of said memory means to couple a keying signal corresponding to the first performance data to said first tone signal producing means;
second coupling means coupled between said memory means and said first key indicating means for coupling a key indicating signal corresponding to said first performance data read out of said memory means to said first key indicating means;
third coupling means coupled between said memory means and said second tone signal producing means for coupling a keying signal corresponding to said second performance data read out of said memory means to said second tone signal producing means;
fourth coupling means coupled between said memory means and said second key designating means for coupling a key indicating signal corresponding to said second performance data to said second key indicating means;
first disabling means for selectively disabling said first coupling means from coupling said keying signal to said first tone signal producing means;
second disabling means for selectively disabling said second coupling means from coupling said key indicating signal to said first key indicating means;
third disabling means for selectively disabling said third coupling means from coupling said keying signal to said second tone signal producing means; and
fourth disabling means for selectively disabling said fourth coupling means from coupling said key indicating signal to said second key indicating means.

8. The electronic musical instrument according to claim 7, in which said first and second disabling means are interlocked with each other so that one of them is inoperative when the other is operative, and said third and fourth disabling means are interlocked with each other so that one of the third and fourth disabling means is inoperative when the other is operative.

9. The electronic musical instrument according to claim 7 wherein said first and second key indicating means each include means for visually indicating a key to be depressed on their respective keyboard means.

10. The electronic musical instrument according to claim 9 wherein said key indicating means each comprise a visual indicator for each of the keys of their respective keyboard means.

11. The electronic musical instrument according to any one of claims 1, 2 or 5, wherein said key indicating means comprises means for visually indicating a key to be depressed on said keyboard means.

12. The electronic musical instrument according to claim 11, wherein said key indicating means comprises a visual indicator associated with each respective key of said keyboard means.

* * * * *